United States Patent [19]

Fanning et al.

[11] 4,314,884

[45] Feb. 9, 1982

[54] NUCLEAR FUEL ASSEMBLY

[75] Inventors: Alan W. Fanning; William G. Jameson, Jr.; Victor E. Hazel, all of San Jose, Calif.

[73] Assignee: General Electric Company, San Jose, Calif.

[21] Appl. No.: 40,997

[22] Filed: May 21, 1979

[51] Int. Cl.³ .............................................. G21C 3/30
[52] U.S. Cl. ..................................... 376/441; 376/444
[58] Field of Search .............................. 176/76, 78, 79

[56] References Cited

U.S. PATENT DOCUMENTS

| Re. 30,247 | 4/1980 | Andrews | 176/78 |
|---|---|---|---|
| 3,132,076 | 5/1964 | West | 176/44 |
| 3,654,077 | 4/1972 | Lass | 176/78 |
| 3,802,995 | 4/1974 | Fritz | 176/78 |
| 3,808,098 | 4/1974 | Fredin | 176/54 |
| 3,890,196 | 6/1975 | Chetter | 176/78 |
| 3,904,475 | 9/1975 | Tashima | 176/78 |
| 4,089,742 | 5/1978 | Amaral | 176/78 |
| 4,152,205 | 5/1979 | Kröpfl | 176/78 |

Primary Examiner—Donald P. Walsh
Attorney, Agent, or Firm—Ivor J. James, Jr.; Samuel E. Turner; Raymond G. Simkins

[57] ABSTRACT

A fuel assembly for a nuclear reactor including a plurality of fuel rods held in spaced, parallel position between upper and lower tie plates and retained in lateral position by intermediate spacers and having a water tube in lieu of a fuel element in one or more of the rod positions, the water tubes having an outside diameter greater than that of the fuel rods and the spacer springs in the spacer cells of the water tubes being modified to accommodate the larger diameter of the water tubes.

10 Claims, 4 Drawing Figures

NUCLEAR FUEL ASSEMBLY

BACKGROUND

Nuclear power reactors are well known and are discussed, for example, by M. M. El-Wakil in "Nuclear Power Engineering" McGraw-Hill Book Company Inc., 1976.

In a known type of nuclear power reactor, for example, as used in the Dresden I reactor of the Dresden Nuclear Power Station near Chicago, Ill., the reactor core is of the heterogenous type. In such reactors the nuclear fuel comprises elongated rods formed of sealed cladding tubes of suitable material, such as a zirconium alloy, containing uranium oxide and/or plutonium oxide as the nuclear fuel, for example, as shown in U.S. Pat. No. 3,365,371. A number of such fuel rods are grouped together and contained in an open-ended tubular flow channel to form a separately removable fuel assembly or bundle. A sufficient number of fuel assemblies are arranged in a matrix, approximating a right circular cylinder, to form the nuclear reactor core capable of self-sustained fission reaction. The core is submerged in a fluid, such as light water, which serves both as a coolant and as a neutron moderator.

A typical fuel assembly is formed by an array of spaced fuel rods supported between upper and lower tie plates, the rods being several feet in length, on the order of one-half inch in diameter and spaced from one another by a fraction of an inch. To provide proper coolant flow past the fuel rods it is important to maintain the rods in spaced position and restrain them from bowing and vibrating during reactor operation. A plurality of fuel rod spacers spaced along the length of the fuel assembly are provided for this purpose. Such spacers are shown, for example, in U.S. Pat. No. 3,654,077.

As positioned in the reactor core, the fuel assemblies are spaced from one another and thus are surrounded by a slab of the water-moderator. Thus the peripheral fuel rods are exposed to a higher thermal neutron flux than the fuel rods of the inner and less moderated region of the fuel assembly.

Flatter thermal neutron flux across the fuel assembly, with improved fuel utilization and decreased local power peaking, can be achieved by increasing the neutron moderation in the inner portion of the fuel assembly. This may be accomplished by replacing one or more of the inner fuel rods with water tubes formed with passages by which relatively cool water is conducted upwardly through the inner portion of the assembly. An arrangement of such water tubes is shown in U.S. Pat. No. 3,802,995.

Moderation through the inner portion of the fuel assembly can be increased by increasing the number of water tubes. However, this approach has a practical limit since each water tube replaces a fuel rod and thus undesirably decreases the fuel containing capacity of the fuel assembly.

An object of this invention is to increase the neutron moderation in the inner portion of a fuel assembly without increasing the number of water tubes. Another object is a fuel rod spacer with spring means for accommodating water tubes of larger diameter than the fuel rods.

SUMMARY

In accordance with the invention, neutron moderation in the inner portion of the fuel assembly is increased, without increasing the number of water tubes, by providing one or more water tubes of diameter greater than that of the fuel rods. To accommodate the larger water tubes the fuel rod spacers are modified, without substantial redesign, by providing W-shaped spring members in the spacer cells occupied by the water tubes, the W-shaped spring members requiring less space but providing substantially the same resilient force as the V-shaped spring members which they replace.

DRAWING

The invention is described hereinafter with reference to the accompanying drawing wherein.

DESCRIPTION

Figure 1:
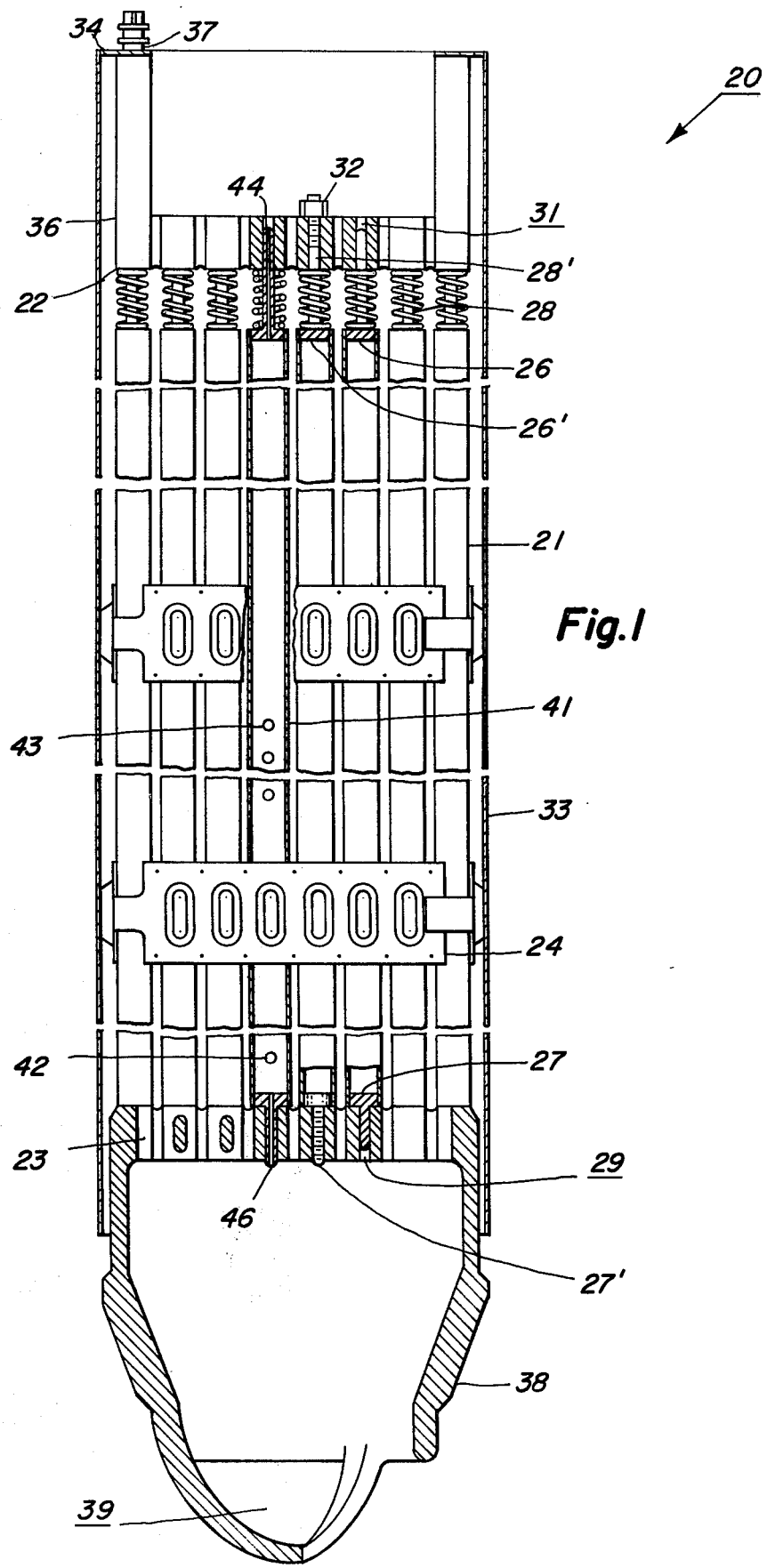
FIG. 1 is a longitudinal section view of a fuel assembly containing a water tube.

A fuel assembly 20 is illustrated in elevation view in FIG. 1. The fuel assembly 20 comprises a plurality of fuel elements or rods 21 supported between a skeletonized upper tie plate 22 and a skeletonized lower tie plate 23. The fuel rods 21 pass through a plurality of fuel rod spacers 24 which provide intermediate support to retain the elongated rods in spaced relation and restrain them from lateral vibration.

Each of the fuel rods 21 is formed of an elongated tube containing fissile fuel and other materials, such as fertile fuel, burnable poison, inert material or the like, sealed in the tube by upper and lower end plugs 26 and 27. Lower end plugs 27 are formed with extensions for registration and support in support cavities 29 formed in the lower tie plate 23. Upper end plugs 26 are formed with extensions 28 which fit into support cavities 31 in the upper tie plate 22.

Several of the support cavities 29 (for example, selected ones of the edge or peripheral cavities) in the lower tie plate 23 are formed with threads to receive fuel rods having threaded lower end plug extensions 27'. Extensions 28' of upper end plugs 26' of these same fuel rods are elongated to pass through the cavities in the upper tie plate 22 and are formed with threads to receive retaining nuts 32. In this matter the upper and lower tie plates and the fuel rods are formed into a unitary structure.

The fuel assembly 20 further includes a thin-walled tubular flow channel 33, of substantially square cross section, sized to form a sliding fit over the upper and lower tie plates 22 and 23 and the spacers 24 so that the channel 33 readily may be mounted and removed. Fixed to the top end of the flow channel 33 is a tab 34 by which the channel is fastened to a standard 36 of upper tie plate 22 by means of a bolt 37.

The lower tie plate 23 is formed with a nose piece 38 adapted to support the fuel assembly 20 in a socket in a core support plate (not shown) in the reactor pressure vessel. The end of this nose piece is formed with openings 39 to receive the pressurized coolant so that it flows upwardly among the fuel rods.

As shown in FIG. 1, one (or more) of the fuel rods 21 in the inner fuel rod positions is replaced by a water tube 41. The water tube 41 is similar in construction to a fuel rod except that it contains no fuel and it is apertured, as shown at 42 and 43, and/or the upper and lower end plugs thereof are formed with passages 44 and 46 to permit flow of water-moderator therethrough.

In accordance with the invention and to increase the amount of water-moderator in the inner portion of the fuel assembly, the water tube 41 has an outside diameter greater than the diameter of the fuel rods 21. For example, the water tube 41 may have an outside diameter of about 15 mm while the fuel rods 21 have an outside diameter of about 12 mm.

The spacers 24 may be similar in construction to that shown in FIGS. 5-10 of U.S. Pat. No. 3,654,077 which is incorporated herein by reference and to which reference is made for construction details.

Figure 2:
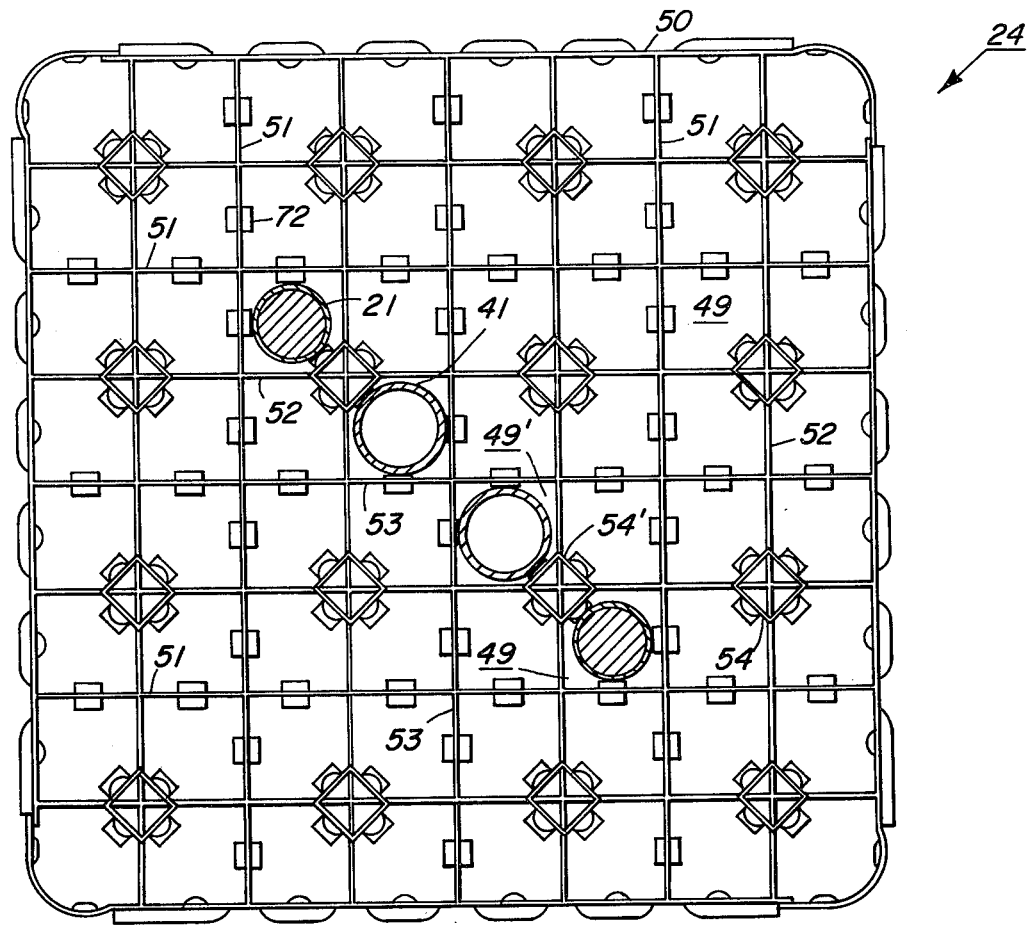
FIG. 2 is plan view of a fuel element spacer.

In accordance with the invention the spacers 24 are modified, without extensive redesign, to accommodate the larger diameter water tubes 41. A modified spacer 24 is illustrated in FIG. 2.

Such a spacer includes a peripheral band 50 supporting a plurality of cross-laced divider members including divider members 51, spring support divider members 52 and modified divider members 53, these divider members being spaced to form a plurality of passages or cells 49. As illustrated in FIG. 2, representative fuel rods 21 are shown extending through cells 49 while water tubes 41 extend through cells 49'. Supported at intersections of the divider members 52 are four-sided box spring assemblies 54 formed with outwardly extending V-shaped spring members whereby one of these spring members extends into each of the cells 49 and urges the fuel rod therein into contact with oppositely positioned, relatively rigid projections formed in the divider members such as a projection 72.

Figure 3:
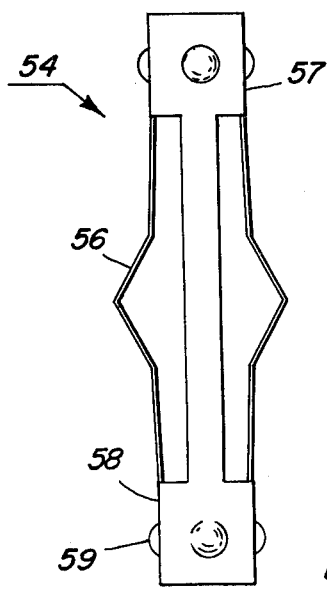
FIG. 3 is an elevation view of a box spring assembly.

A box spring assembly 54, as illustrated in FIG. 3, includes four outwardly extending spring members 56 supported between upper and lower box end portions 57 and 58. Each of the four sides of these end portions is formed with a hemispherical projection 59 for limiting contact area with and lateral movement of the adjacent fuel rod.

An initial attempt to modify the spacer 24 for accommodation of larger diameter water tubes consisted of modifying the adjacent spring assembly by foreshortening the sides of the box end members 57 and 58 adjacent the water tube, omitting the projections 59 from these sides and reducing the projection of the rigid stops 72 in the cells 49' of the water tubes. The spring member 56 engaging the water tube remained the same.

However, upon experimental fuel bundle assembly, the insertion of the oversized water tube was found to require an excessively high force, greater than the force generally required to insert fuel rods, and therefore out of balance with desired fuel rod preloads. The high insertion force was found to result from deflection of the spring member 56 which caused it to contact the adjacent spacer divider members thereby reducing the effective spring length and consequently increasing the spring stiffness. Additionally, contact of the spring member with the divider members caused movement of the entire box spring assembly away from the fuel rod in the diagonally adjacent cell resulting in undesirably reduced spring force on that fuel rod. The contact problem could be solved by reducing the width of the spring member 56 in the water tube cell 49'. However, this would result in such a reduction in the spring constant that the desired preload spring force on the water rods would not be achieved.

Figure 4:
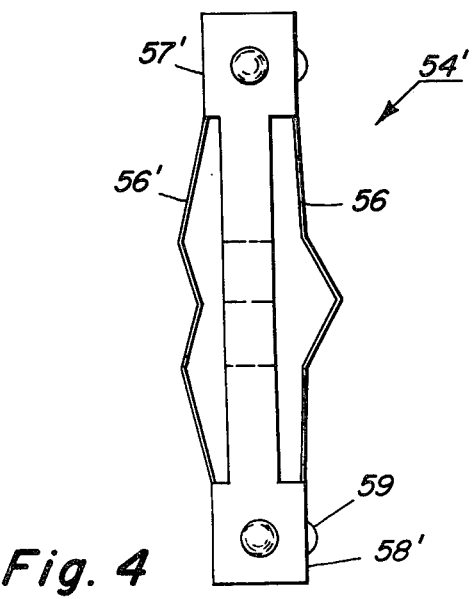
FIG. 4 is an elevation view of a modified box spring assembly.

Therefore, in accordance with the invention and as illustrated in FIG. 4, a modified box spring assembly 54' was conceived which is compatible with the spacer structure and which provides appropriate and substantially equal spring force loads on the water tubes and adjacent fuel rods.

The box spring assembly 54' of FIG. 4 includes the following modifications as compared to the box spring assembly 54 of FIG. 3: The box end members 57' and 58' are foreshortened on the side adjacent the cell 49' of the water tube, the projections 59 are omitted from this side and a W-shaped spring member 56' replaces the V-shaped spring member 56 on this side.

The width and specific shape of the W-shaped spring member 56' were selected to provide substantially the same spring force on the water tubes as the V-shaped spring member 56 provides on the fuel rods, and thus similar stress levels are established in both types of spring members to preclude differences in spring relaxation rates during operation in the reactor that would lead to unequal spring forces. The W-shape of the water tube spring member projects the member away from the spacer divider members and thus prevents contact therewith.

While the W-shape of the water tube spring member 56' allows two contact points with the water tube and the reduced projection of the rigid members 72 in the water tube cells 49' results in a smaller clearance between the water tube and the spacer divider members, this is not objectionable for the unfueled water tube as compared to the heat producing fuel rods where it is desirable to minimize contact area with the spacer to avoid interference with coolant flow and "hot spots."

The box spring assemblies 54 and 54' are formed of spring material suitable for in-reactor use such as Inconel or Alloy X-750 while other parts of the spacers 24 preferably are formed of a material having low neutron capture cross section such as a zirconium alloy.

What is claimed is:

1. In a fuel assembly for use with a plurality of fuel assemblies and a neutron moderator fluid in a nuclear reactor core including a plurality of elongated fuel rods of predetermined outside diameter arranged in spaced array: at least one spacer positioned intermediate the ends of said fuel rods forming a plurality of cells for passage of said fuel rods therethrough; a spring member extending into each of the cells occupied by a fuel rod and engaging the fuel rod therein for lateral support thereof; at least one hollow tube positioned in an inner position of said assembly and passing through a cell of said spacer, said hollow tube being formed with means for entrance and egress of moderator fluid, said hollow tube having an outside diameter greater than the outside diameter of said fuel rods; and a W-shaped spring member extending into the cell of said spacer occupied by said hollow tube and providing two points of contact therewith for lateral support thereof.

2. The fuel assembly of claim 1 wherein the spring members extending into cells occupied by fuel rods are V-shaped to provide a single point of contact with the fuel rods.

3. The fuel assembly of claim 2 wherein the W-shaped spring member provides substantially the same force against said hollow tube as the V-shaped spring member provides against a fuel rod.

4. The fuel assembly of claim 1 wherein the cells of said spacer are formed by cross-laced, intersecting divider members and wherein said spring members each comprise 4-sided box spring assemblies supported at intersections of said divider members such that a spring member of said assemblies extends diagonally into each of the spacer cells, each of said box spring assemblies formed of spaced box end portions connected by a separate spring member on each side, the side of the box spring assembly adjacent the spacer cell occupied by said hollow tube being foreshortened and provided with said W-shaped spring member.

5. The fuel assembly of claim 4 wherein the box end portions of said spring assemblies are formed with hemispherical projections on the sides adjacent spacer cells occupied by fuel rods.

6. A nuclear fuel assembly comprising: a plurality of fuel rods of predetermined outside diameter; support means providing a plurality of positions to support said fuel rods in spaced array; a hollow tube supported in one of said support positions, said tube having means for receiving therein and discharging therefrom a liquid moderator, said hollow tube having an outside diameter greater than said outside diameter of said fuel rods to thereby conduct a greater amount of liquid-phase moderator through said assembly; a spacer positioned intermediate the ends of said fuel rods forming passages of similar cross section area for said fuel rods and said hollow tube and with spring means engaging said fuel rods for lateral support thereof and with modified spring means engaging said hollow tube for lateral support thereof.

7. The fuel assembly of claim 6 wherein said spring means engaging said fuel rods comprises spring members having a V shape providing a single point of contact with said fuel rods and wherein said modified spring means has a W shape providing two points of contact with said hollow tube.

8. In a fuel assembly for use with a plurality of fuel assemblies and a neutron moderator fluid in a nuclear reactor core including a plurality of elongated fuel rods of predetermined outside diameter arranged in spaced array: at least one spacer positioned intermediate the ends of said fuel rods, said spacer comprising a peripheral support band supporting a plurality of cross-laced divider members forming a plurality of cells of like cross section area for passage of said fuel rods therethrough; first support means extending into each of the cells occupied by a fuel rod and engaging said fuel rod for lateral support thereof; at least one hollow tube supported in said assembly and passing through one of said cells of like cross section area of said spacer, said hollow tube having means for receiving therein and discharging therefrom a portion of said moderator fluid, said hollow tube having an outside diameter greater than the outside diameter of said fuel rods; and second support means different from said first support means extending into said one of said cells occupied by said hollow tube and engaging said hollow tube for lateral support thereof.

9. The fuel assembly of claim 8 wherein said first support means includes a V-shaped spring member providing a single contact point between said V-shaped spring member and the fuel rod which it engages.

10. The fuel assembly of claim 8 or claim 9 wherein said second support means includes a W-shaped spring member providing two contact points between said W-shaped spring member and said hollow tube.

* * * * *